(12) United States Patent
Lee et al.

(10) Patent No.: US 9,007,289 B2
(45) Date of Patent: Apr. 14, 2015

(54) THIN FILM TRANSISTOR ARRAY PANEL AND LIQUID CRYSTAL DISPLAY

(75) Inventors: Seong-Young Lee, Anyang-si (KR); Ji-Sun Kim, Seoul (KR); Sung-Hoon Kim, Seoul (KR); Si Hyun Ahn, Cheonan-si (KR); Chang hoon Baek, Seoul (KR); Chong-Chul Chai, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 352 days.

(21) Appl. No.: 13/081,591

(22) Filed: Apr. 7, 2011

(65) Prior Publication Data

US 2012/0086685 A1 Apr. 12, 2012

(30) Foreign Application Priority Data

Oct. 7, 2010 (KR) .......................... 10-2010-0097921

(51) Int. Cl.
| | |
|---|---|
| *G02F 1/136* | (2006.01) |
| *G02F 1/1343* | (2006.01) |
| *G09G 3/36* | (2006.01) |
| *G09G 5/00* | (2006.01) |
| *G02F 1/1362* | (2006.01) |

(52) U.S. Cl.
CPC ...... *G02F 1/13624* (2013.01); *G02F 1/136213* (2013.01); *G02F 2001/134345* (2013.01)

(58) Field of Classification Search
CPC .......................................... G02F 2001/136218
USPC ................................ 349/44, 139; 345/92, 206
See application file for complete search history.

(56) References Cited

U.S. PATENT DOCUMENTS

| | | | |
|---|---|---|---|
| 7,663,708 B2 | 2/2010 | Wang | |
| 7,880,849 B2 * | 2/2011 | Kim et al. | 349/144 |
| 2008/0084529 A1 | 4/2008 | Wang | |
| 2008/0252802 A1 | 10/2008 | Wang | |
| 2009/0256985 A1 * | 10/2009 | Jung et al. | 349/48 |
| 2010/0140624 A1 * | 6/2010 | Ishii | 257/59 |

FOREIGN PATENT DOCUMENTS

| | | |
|---|---|---|
| JP | 10-301140 | 11/1998 |
| KR | 10-0488942 | 5/2005 |
| KR | 10-2007-0001792 | 1/2007 |
| KR | 10-0672626 | 1/2007 |
| KR | 10-0752207 | 8/2007 |
| KR | 10-2008-0068376 | 7/2008 |

* cited by examiner

*Primary Examiner* — Lun-Yi Lao
*Assistant Examiner* — Ibrahim Khan
(74) *Attorney, Agent, or Firm* — H.C. Park & Associates, PLC

(57) ABSTRACT

A liquid crystal display includes a first gate line; a common voltage line separated from the first gate line; a data line insulated from and crossing the first gate line and the common voltage line; a first switching element connected to the first gate line and the data line; a second switching element connected to the first gate line and the data line; a first liquid crystal capacitor connected to the first switching element; a second liquid crystal capacitor connected to the second switching element; a third switching element connected to the first switching element; an assistance capacitor connected to the third switching element and the common voltage line; and a shielding electrode extending in the same direction as the first gate line and connected to the first switching element.

16 Claims, 9 Drawing Sheets

THIN FILM TRANSISTOR ARRAY PANEL AND LIQUID CRYSTAL DISPLAY

CROSS REFERENCE TO RELATED APPLICATION

This application claims priority from and the benefit of Korean Patent Application No. 10-2010-0097921 filed on Oct. 7, 2010, which is hereby incorporated by reference for all purposes as if fully set forth herein.

BACKGROUND OF THE INVENTION

1. Field of the Invention

Exemplary embodiments of the present invention relate to a thin film transistor array panel and a liquid crystal display including the same.

2. Discussion of the Background

A liquid crystal display is one of the most widely used flat panel displays and may include field generating electrodes such as a pixel electrode and a common electrode and a liquid crystal layer therebetween. The liquid crystal display generates an electric field in the liquid crystal layer by applying a voltage to the field generating electrodes to determine the direction of the molecular axes of liquid crystal molecules in the liquid crystal layer with respect to the display surface of the liquid crystal display. The control of the direction of the liquid crystal molecules effectively determines the polarization of incident light through the liquid crystal layer to display images by selectively filtering light based on its polarization.

Among liquid crystal displays, a vertically aligned mode liquid crystal display that aligns major axes of the liquid crystal molecules to be perpendicular to upper and lower display plates when the electric field is not applied may have a large contrast and may easily implement a wide viewing angle.

On the other hand, the vertically aligned mode liquid crystal display may have lower side visibility than front visibility. In order to solve the problem, one pixel may be subdivided into two sub-pixels with the voltage of the two sub-pixels being different from each other to produce multiple domains within the pixel so that the liquid crystal molecules may be aligned in different directions depending upon the location of the liquid crystal molecule, i.e., in which domain the liquid crystal molecules is located.

The divided pixel is connected to a thin film transistor with respect to the gate line; however, light leakage may occur near the gate line. Particularly when an external impact is applied, light leakage may increase near the gate line.

The information disclosed in this section is only for understanding of the background of the invention and may contain information that does not form the prior art

SUMMARY OF THE INVENTION

Exemplary embodiments of the present invention provide a thin film transistor array panel that may decrease light leakage at a portion adjacent to a gate line although an external impact is applied.

Exemplary embodiments of the present invention also provide a thin film transistor array panel having a shielding electrode that may be formed close to a gate line such that light leakage may be prevented at a portion near the gate line although an external impact is applied.

Additional features of the invention will be set forth in the description which follows, and in part will be apparent from the description, or may be learned by practice of the invention.

An exemplary embodiment of the present invention discloses a liquid crystal display that comprises a first gate line; a common voltage line separated from the first gate line; a data line insulated from and crossing the first gate line and the common voltage line; a first switching element connected to the first gate line and the data line; a second switching element connected to the first gate line and the data line; a first liquid crystal capacitor connected to the first switching element; a second liquid crystal capacitor connected to the second switching element; a third switching element connected to the first switching element; a capacitor connected to the third switching element and the common voltage line; and an electrode extending in the same direction as the first gate line and connected to the first switching element.

An exemplary embodiment of the present invention also discloses a thin film transistor array panel that comprises an insulation substrate; a first gate line disposed on the insulation substrate; a data line crossing the first gate line; a first switching element connected to the first gate line and the data line; a pixel electrode connected to the first switching element; a shielding line overlapping the data line and extending lengthwise according to the data line; and an electrode connecting two neighboring shielding lines.

An exemplary embodiment of the present invention further discloses a thin film transistor array panel that comprises an insulation substrate; a gate line disposed on the insulation substrate; a data line crossing the gate line; a switching element connected to the gate line and the data line; a pixel electrode connected to the switching element; and an electrode separated from the gate line and extending in the same direction as the gate line. The pixel electrode comprises a first sub-pixel electrode and a second sub-pixel electrode. The first sub-pixel electrode and the second sub-pixel electrode are both configured to receive a voltage. The voltage received by the first sub-pixel electrode is less than the voltage received by the second sub-pixel electrode, and the electrode is connected to the first sub-pixel electrode.

An exemplary embodiment of the present invention additionally discloses a method of manufacturing a liquid crystal display comprising a thin film transistor array panel. The method comprises forming a gate line on a substrate; forming a data line on the substrate crossing and insulated from the gate line; forming a common voltage line on the substrate and separated from the first gate line; forming a first switching element connected to the gate line and to the data line; forming a second switching element connected to the gate line and to the data line; forming a first liquid crystal capacitor with the first switching element and an opposing electrode with a liquid crystal layer as the dielectric material; forming a second liquid crystal capacitor with the second switching element and the opposing electrode with the liquid crystal layer as the dielectric material; forming a third switching element connected to the first switching element; forming a capacitor with the third switching element and the common voltage line; and forming an electrode extending in the same direction as the first gate line and connected to the first switching element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
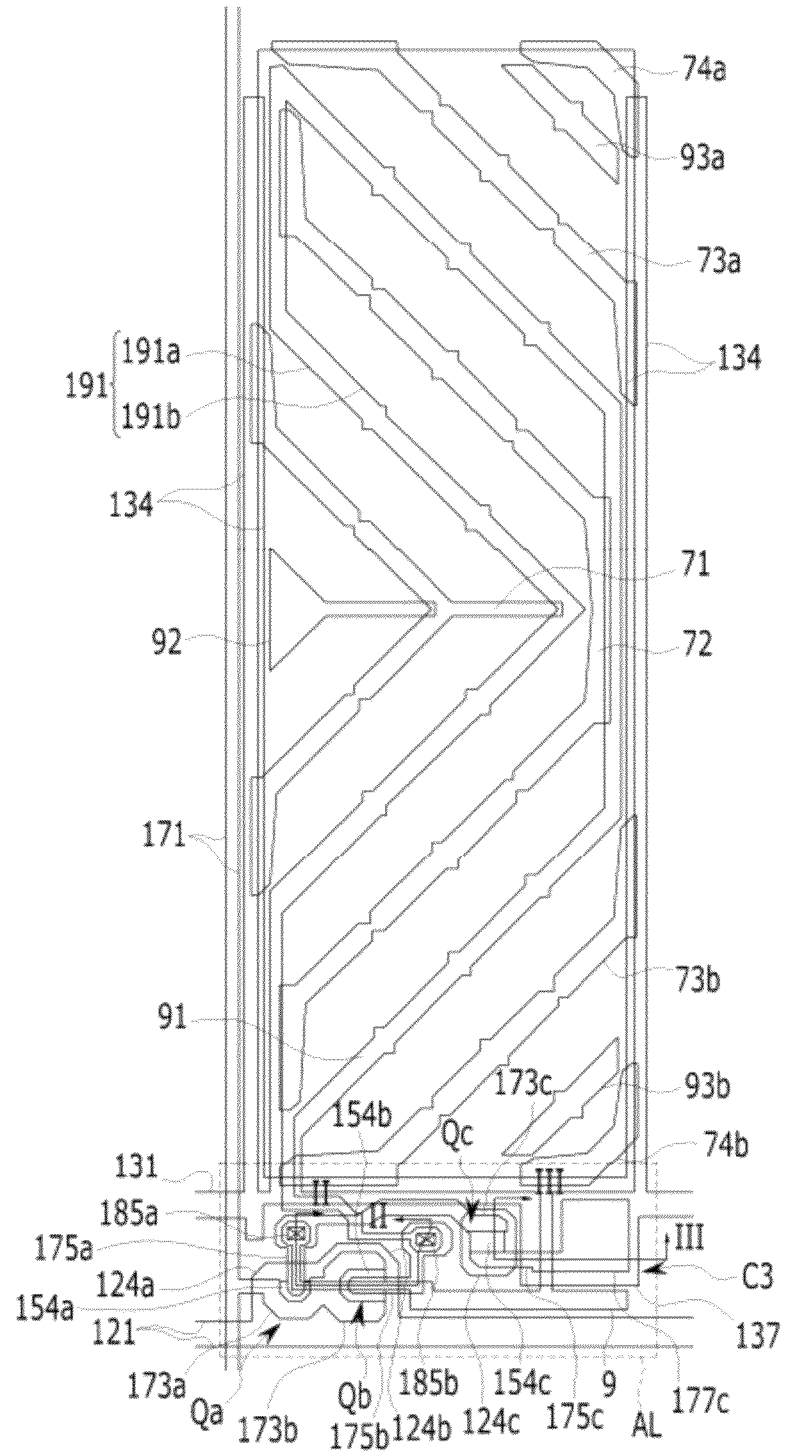
FIG. 1 is a layout view of a liquid crystal display according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

A liquid crystal display according to the present invention will be described with reference to FIG. 1, FIG. 2, and FIG. 3.

FIG. 1 is a layout view of a liquid crystal display according to an exemplary embodiment of the present invention. FIG. 2 is a cross-sectional view taken along line II-II of FIG. 1, and FIG. 3 is a cross-sectional view taken along line III-III of FIG. 1.

Figure 2:
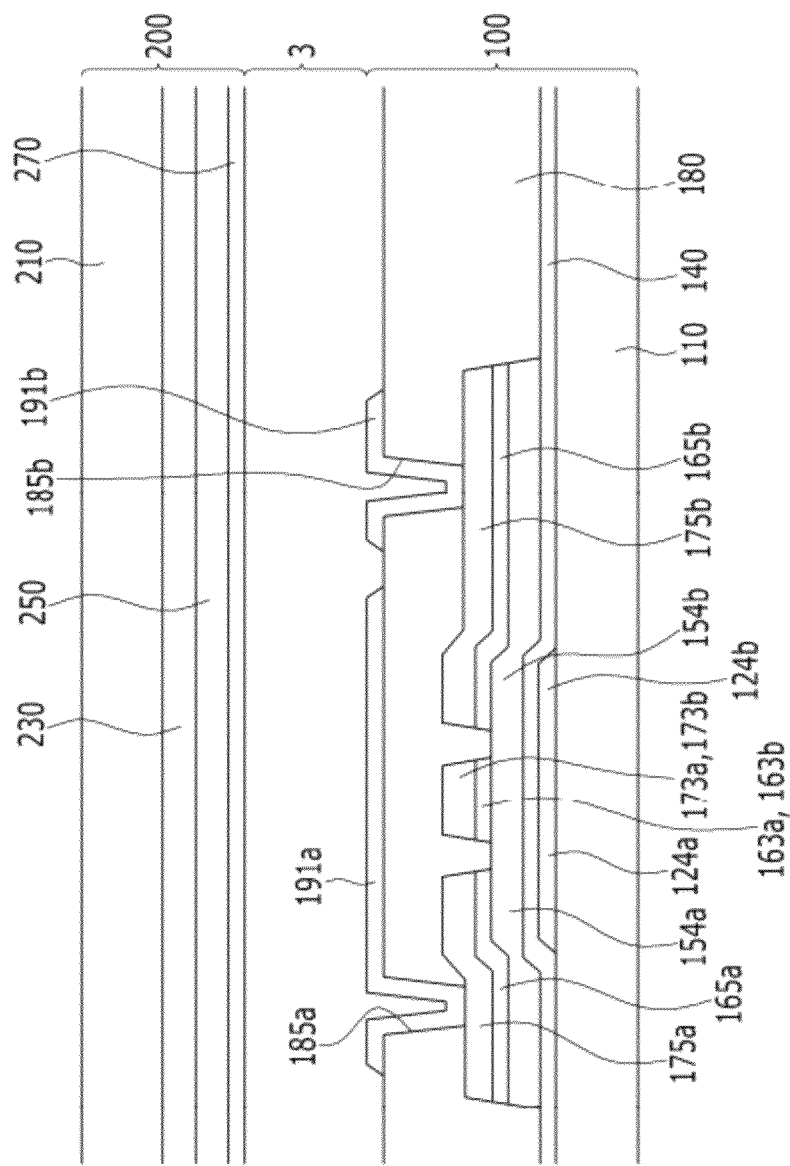
FIG. 2 is a cross-sectional view taken along line II-II of FIG. 1.
Figure 3:
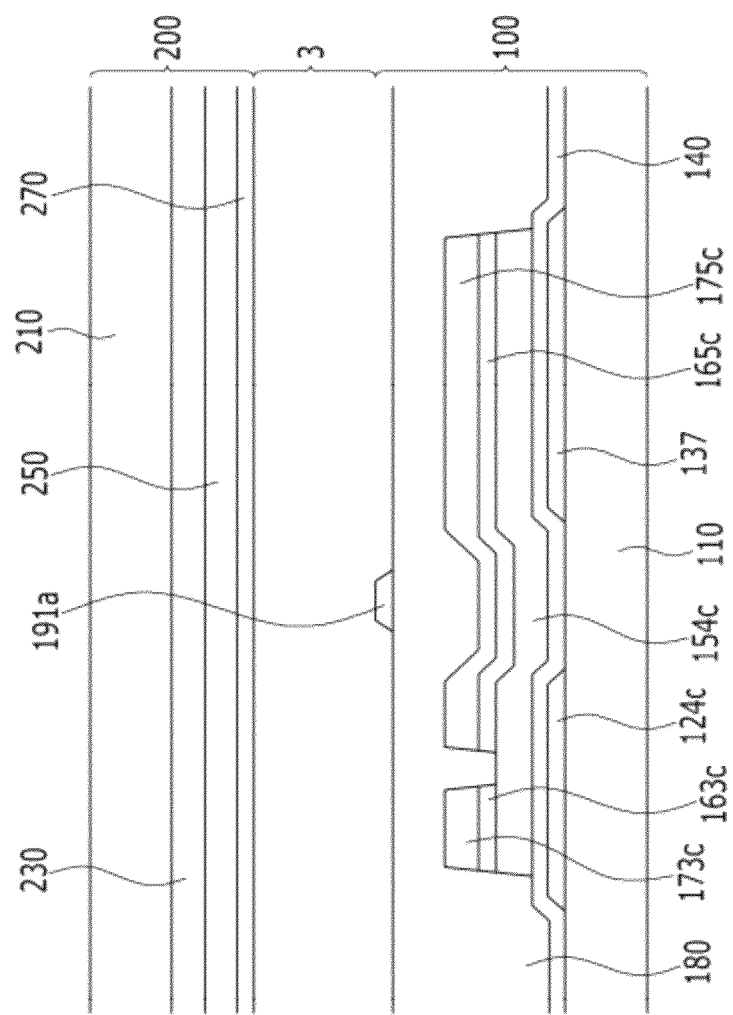
FIG. 3 is a cross-sectional view taken along line III-III of FIG. 1.

As shown in FIG. 1, FIG. 2, and FIG. 3, a liquid crystal display according to an exemplary embodiment of the present invention includes a lower panel 100 and an upper panel 200 facing each other, and a liquid crystal layer 3 is interposed between the two display panels 100 and 200.

First, the lower panel 100 will be described.

A plurality of gate conductors including a plurality of gate lines 121, a third gate electrode 124c, and a plurality of common voltage lines 131 are formed on an insulating substrate 110.

The gate lines 121 mainly extend in a transverse direction and transfer the gate signal. Each gate line 121 includes a first gate electrode 124a and a second gate electrode 124b that protrude from the gate line 121. The first gate electrode 124a and the second gate electrode 124b may be connected to each other. The third gate electrode 124c electrically floats and may be generally rectangle shaped although other shapes may be used.

The common voltage line 131 mainly extends in a horizontal direction and transfers a voltage such as a common voltage Vcom, etc. The common voltage line 131 includes a storage electrode 137 (that extends and protrudes downward from the common voltage line 131) and a pair of longitudinal portions 134 that extend upward from the common voltage 131 and are approximately vertical with respect to the gate line 121.

A gate insulating layer 140 is formed on the gate conductor.

A plurality of semiconductor stripes (not shown) made of amorphous silicon or crystalline silicon, etc., are formed on the gate insulating layer 140. Each semiconductor stripe mainly extends in a vertical direction and includes first and second semiconductors 154a and 154b (that extend to face the first and second gate electrodes 124a and 124b and are connected to each other) and a third semiconductor 154c that extends from the second semiconductor 154b and is positioned on the third gate electrode 124c.

A pair of ohmic contacts 163a and 165a is positioned on the first semiconductor 154a, and a pair of ohmic contacts 163b and 165b is positioned on the second semiconductor 154b. In addition, a pair of ohmic contacts 163c and 165c is positioned on the third semiconductor 154c. The ohmic contact 163a may be connected to the ohmic contact stripe (not shown) positioned on the semiconductor stripe, the ohmic contacts 165a and 163b may be connected to each other, and the ohmic contacts 165b and 163c may be connected to each other. The ohmic contacts 163a, 165a, 163b, 165b, 163c, and 165c may be made of materials such as n+ hydrogenated amorphous silicon, etc., doped with an n-type impurity such as phosphorus at a high concentration, or of a silicide.

A data conductor including a plurality of data lines 171, a plurality of first drain electrodes 175a, a plurality of second drain electrodes 175b, and a plurality of third drain electrodes 175c are formed on the ohmic contacts 163a, 165a, 163b, 165b, 163c, and 165c and the gate insulating layer 140.

The data lines 171 transfer the data signal and mainly extend in a longitudinal direction to intersect the gate line 121 and the common voltage line 131. Each data line 171 includes a first source electrode 173a and a second source electrode 173b that extend to the first gate electrode 124a and the second gate electrode 124b and that may be connected to each other.

The first drain electrode 175a, the second drain electrode 175b, and the third drain electrode 175c respectively include one end of a bar-type and another end having a relatively wide area. The bar-type ends of the first drain electrode 175a and the second drain electrode 175b are partially surrounded by the first source electrode 173a and the second source electrode 173b. The end having the wide area of the second drain electrode 175b again extends to form the third source electrode 173c that is a bar type. The third source electrode 173c faces the third drain electrode 175c. An end 177c having the wide area of the third drain electrode 175c forms an assistance capacitor C3 by overlapping with the storage electrode 137 of the common voltage line 131.

The first/second/third gate electrodes 124a/124b/124c, the first/second/third source electrodes 173a/173b/173c, and the first/second/third drain electrodes 175a/175b/175c form the first/second/third thin film transistors (TFT) Qa/Qb/Qc together with the first/second/third semiconductors 154a/154b/154c, and the channel of the thin film transistor is formed in each semiconductor 154a/154b/154c between each source electrode 173a/173b/173c and each drain electrode 175a/175b/175c.

The semiconductor stripe including the first, second, and third semiconductors 154a, 154b, and 154c may have substantially the same planar shape as the data conductor and the ohmic contacts 163a, 165a, 163b, 165b, 163c, and 165c on the lower portion thereof, except for the channel region between the first, second, and third source electrodes 173a, 173b, and 173c and the first, second, and third drain electrodes 175a, 175b, and 175c.

A passivation layer 180, which may be made of an organic insulating material, etc., is formed on the portions of the data conductor and the exposed first, second, and third semiconductors 154a, 154b, and 154c. The passivation layer 180 is formed with a first contact hole 185a exposing the wide end of the first drain electrode 175a and a second contact hole 185b exposing the wide end of the second drain electrode 175b.

A plurality of pixel electrodes 191 and shielding electrodes 9 is formed on the passivation layer 180 and may be made of a transparent conductive material such as indium tin oxide (ITO) or indium zinc oxide (IZO), etc., or a reflective metal such as aluminum, silver, chromium, or alloys thereof, etc. One pixel electrode 191 includes a first sub-pixel electrode 191a and a second sub-pixel electrode 191b, and the entire shape of the pixel electrode 191 may be a quadrangle. The first sub-pixel electrode 191a is surrounded by the second sub-pixel electrode 191b with a gap 91 between the first and second sub-pixel electrodes 191a and 191b.

The second sub-pixel electrode 191b includes a triangle portion inserted between two oblique portions of the first sub-pixel electrode 191a and includes a cutout 92 having a funnel shape and cutouts 93a and 93b positioned at the upper and lower portions of the two oblique portions of the first sub-pixel electrode 191a.

The cutout 92 includes two oblique sides that extend in parallel with the oblique side of the gap 91 and two horizontal sides that are connected to the two oblique sides and extending in a horizontal direction, and the cutouts 93a and 93b are also formed in parallel with the oblique side of the gap 91 and face each other.

The two oblique sides of the gap 91, the two oblique sides of the cutout 92, and the cutouts 93a and 93b may form an angle of about 45° or 135° with respect to the gate line 121.

The second sub-pixel electrode 191a includes two oblique portions of the lower portion and the upper portion that obliquely extend with respect to the gate line 121. The oblique portions are respectively positioned at the upper portion and the lower portion with respect to the transverse center line bisecting the pixel electrode in the up/down direction and are connected to each other. The area of the second sub-pixel electrode 191b may be smaller than the area of the first sub-pixel electrode 191a.

The first sub-pixel electrode 191a is supplied with the data voltage from the first drain electrode 175a through the first contact hole 185a, and the second sub-pixel electrode 191b is supplied with the data voltage from the second drain electrode 175b through the second contact hole 185b. In this case, the first sub-pixel electrode 191a and the second sub-pixel electrode 191b may have the same data voltages, which are supplied from the first and second switching elements Qa and Qb.

The shielding electrode 9 is connected to the first sub-pixel electrode 191a and extends in the direction parallel to the gate line 121. The length of the shielding electrode 9 may be greater than ½ of the length of the transverse edge of the pixel electrode. To minimize the distortion of the decreasing curved line of the pixel due to the shielding electrode 9, the electric field of the sub-pixel connected to the shielding electrode 9 may be less than the electric field of the sub-pixel that is not connected to the shielding electrode 9.

In an exemplary embodiment of the present invention, to minimize space loss, i.e., conserve space, the first switching element Qa, the second switching element Qb, and the third switching element Qc are positioned between two neighboring pixel electrodes. Here, among two pixel electrodes, the lower edge of the upper pixel electrode overlaps the common voltage line 131, and the upper edge of the lower pixel electrode overlaps the gate line 121.

The distance from the transverse edge of the pixel electrode 191 overlapping the gate line 121 to the shielding electrode 9 may be less than 5 μm. When it is larger than 5 μm, light leakage may be generated near the gate line. When the gap is less than 5 μm, the space between the transverse edge of the pixel electrode 91 and the shielding electrode 9 forms a slit such that the electric field due to the gate line 121 is blocked. Accordingly, light leakage between the gate line 121 and the pixel electrode 191 may be prevented. Also, in an exemplary embodiment of the present invention, the passivation layer 180 may be formed with organic material having a low dielectric constant to effectively block the electric field due to the gate line.

Figure 4:
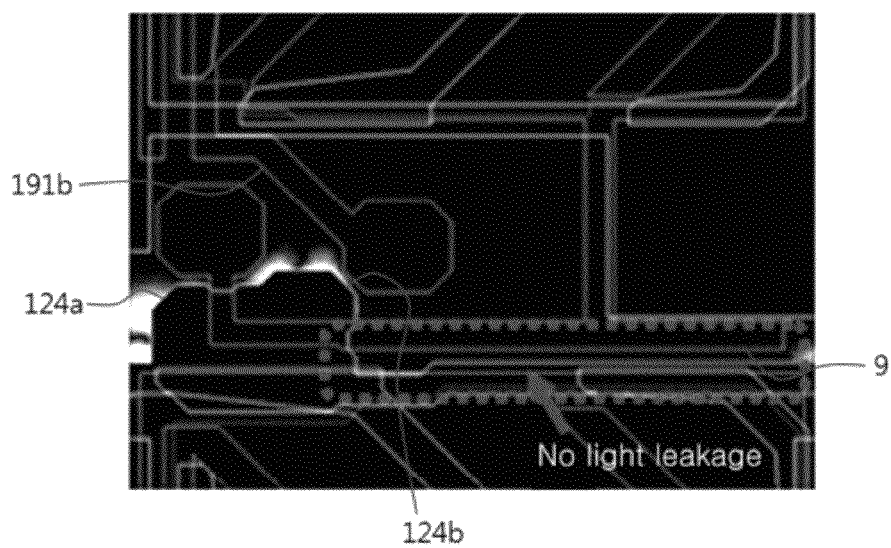
FIG. 4 is a photograph showing a black state of a AL-portion of FIG. 1.

FIG. 4 is a photograph showing a black state of a AL-portion of FIG. 1.

Referring to FIG. 4, although an external impact is applied, the light leakage may not be generated in the black state, i.e., light does not transmit between the gate line and the pixel electrode.

An alignment layer (not shown) may be formed on the pixel electrode 191.

Next, the upper panel 200 is described.

A light blocking member (not shown) is formed on an insulation substrate 210. The light blocking member blocks light leakage between the pixel electrodes 191 and includes an opening (not shown) defining an opening region facing the pixel electrode 191.

A plurality of color filters 230 are formed on the substrate 210 and the light blocking member. Most of the color filters may exist in a region surrounded by the light blocking member and may extend lengthwise along a column defined by the pixel electrodes 191. Each color filter may represent a primary color such as one of three primary colors (red, green, and blue). In an exemplary embodiment of the present invention, the color filter 230 is formed on the upper panel 200. Alternatively, the color filter 230 may be formed on the lower panel 100. That is, the color filter 230 may be disposed between the data line 171, the drain electrodes 175a/175b/175c and the pixel electrode 191 such that the alignment margin (i.e., the acceptable error due to misalignment of the upper and lower panels 200 and 100) due to the color filter 230 may be increased when the upper panel 200 and the lower panel 100 are aligned to possibly increase the aperture ratio. At least one of the light blocking member and the color filter 230 may be positioned on the lower panel 100.

An overcoat 250 is formed on the color filter 230 and the light blocking member. However, the overcoat 250 may be omitted.

An opposed electrode 270 is formed on the overcoat 250 to face the pixel electrode 191 and may be supplied with the common voltage Vcom. The opposed electrode 270 may be formed on the surface of the overcoat 250 to face the plurality of pixel electrodes 191, for example, all of the pixel electrodes 191. The opposed electrode 270 includes plural pairs of cutouts 71, 72, 73a, 73b, 74a, and 74b that have oblique sides that may be parallel to the gap 91 of the pixel electrodes 191, the oblique side of the cutout 92, and the oblique portion substantially parallel with the cutouts 93a and 93b. Cutouts 71, 72, 73a, 73b, 74a, and 74b further include a longitudinal portion that extends in a vertical direction or in a horizontal direction from the end of the oblique portion. The cutout portion 71 further includes a transverse portion that extends in a horizontal direction at a place where two oblique portions of the cutout portion 71 intersect each other.

An alignment layer (not shown) may be applied to the opposed electrode 270.

Two alignment layers on the lower panel 100 and the upper panel 200 may be vertical alignment layers.

The liquid crystal layer 3 between the lower panel 100 and the upper panel 200 includes liquid crystal molecules having a non-zero dielectric anisotropy. The liquid crystal molecules may be aligned so that the major axes thereof are substantially perpendicular with respect to the surfaces of the two display panels 100 and 200 when there is no applied electric field, i.e., in a field-free environment.

The first sub-pixel electrode 191a of the lower panel 100 forms a first liquid crystal capacitor Clca together with the opposed electrode 270 of the upper panel 200 and the liquid crystal layer 3 therebetween, and the second sub-pixel electrode 191b forms a second liquid crystal capacitor Clcb together with the opposed electrode 270 and the liquid crystal layer 3 therebetween.

The first and second sub-pixel electrodes 191a and 191b to which the data voltage is applied generate an electric field in the liquid crystal layer 3 together with the opposed electrode 270 of the upper panel 200, thereby determining the direction of the liquid crystal molecules of the liquid crystal layer 3 between the two electrodes 191 and 270. The direction in which the liquid crystal molecules are inclined is primarily determined by the horizontal component of the electric field, which is generated by distorting the main electric field where the sides of the gap 91 of the pixel electrode 191, the cutout portions 92, 93a, and 93b, and the cutout portions 71, 72, 73a, 73b, 74a, and 74b of the opposed electrode 270 are substantially vertical with respect to the surfaces of the display panels 100 and 200. The horizontal component of the main electric field becomes substantially vertical, i.e., parallel to the sides of the gap 91 and the cutout portions 92, 93a, 93b, 71, 72, 73a, 73b, 74a, and 74b. As a result, the liquid crystal molecules are inclined in a direction that is substantially vertical. In the exemplary embodiment, the liquid crystal molecules are inclined substantially in four directions due to domains formed by the local electric field. Since the liquid crystal molecules are inclined in multiple directions, the reference viewing angle of the liquid crystal display may be increased.

In addition, the difference between the voltage of the first and second sub-pixel electrodes 191a and 191b and the voltage of the opposed electrode 270 may be considered to be a charge voltage of the first and second liquid crystal capacitors Clca and Clcb, that is, the pixel voltage. The alignment or inclination degree of the liquid crystal molecules may be changed depending on the magnitude of the pixel voltage, and thus a change in the degree of light polarization incident on the liquid crystal layer 3 may be changed as the light traverses the aligned liquid crystal molecules in the liquid crystal layer 3. The change in polarization of the light as it propagates through the liquid crystal layer 3 effects the transmittance of light by an exit polarizer of the liquid crystal display so that images may be displayed.

In an exemplary embodiment of the present invention, the data voltage applied to the first sub-pixel electrode 191a through the first switching element Qa is changed by the third switching elements Qc and the assistance capacitor C3 such that the charging voltage of the second liquid crystal capacitor Clcb and the first liquid crystal capacitor Clca, that is, the inclination degree of the liquid crystal molecules, may be changed.

Figure 5:
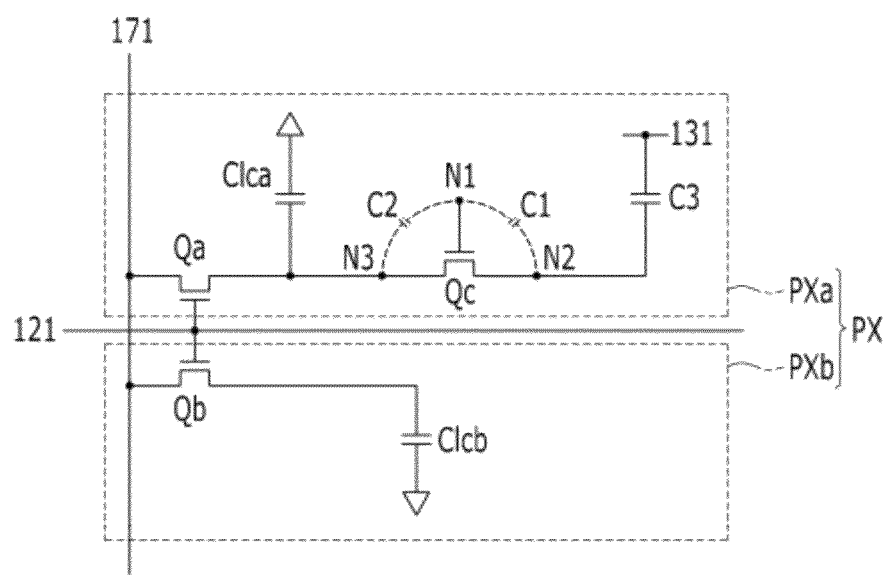
FIG. 5 is an equivalent circuit diagram of one pixel of the liquid crystal display of FIG. 1, FIG. 2, and FIG. 3.

FIG. 5 is an equivalent circuit diagram of one pixel of the liquid crystal display of FIG. 1, FIG. 2, and FIG. 3.

Referring to FIG. 5, the liquid crystal display includes signal lines including a gate line 121, a data line 171, and a common voltage line 131 (represented by the storage electrode line 137 shown in FIG. 5) and a plurality of pixels PX connected thereto. Pixel PX includes a pair of first and second sub-pixels PXa and PXb, wherein the first sub-pixel PXa includes the first sub-pixel electrode 191a, the first liquid crystal capacitor Clca, and the first switching element Qa, and the second sub-pixel PXb includes the second sub-pixel electrode 191b, the second liquid crystal capacitor Clcb, and the second switching element Qb.

The first sub-pixel PXa further includes the third switching element Qc including the third source electrode as the input terminal connected to the first switching element Qa, the third gate electrode as the control terminal that is floated, and the third drain electrode as the output terminal. The assistance capacitor C3 is connected to the third switching element Qc and the common voltage line 131 via the storage electrode line 137. In an exemplary embodiment of the present invention, the first sub-pixel PXa includes the third switching element Qc and the assistance capacitor C3; however, the second sub-pixel PXb may include the third switching element Qc and the assistance capacitor C3.

The first switching element Qa and the second switching element Qb are three-terminal elements such as thin film transistors provided in the lower panel 100 having the control terminal connected to the gate line 121, the input terminal connected to the data line 171, and the output terminal connected to the first liquid crystal capacitor Clca and the second liquid crystal capacitor Clcb, respectively.

The third switching element Qc has the control terminal N1 that is floated, the input terminal N3 connected to the first switching element Qa, and the first liquid crystal capacitor Clca, and the output terminal N2 connected to the assistance capacitor C3. The control terminal N1 and the output terminal N2 of the third switching element Qc form the first capacitor C1, and the control terminal N1 and the input terminal N3 of the third switching element Qc form the second capacitor C2.

One terminal of the assistance capacitor C3 is connected to the output terminal of the third switching element Qc, and the other terminal thereof is connected to the common voltage line 131 via storage electrode line 137.

If the gate line 121 is applied with the gate-on voltage, the first switching element Qa and the second switching element Qb connected thereto are turned on, and the data voltage of the data line 171 is applied to the first and second sub-pixel electrodes 191a and 191b (FIG. 1).

If the data voltage of a positive polarity is applied to the data line 171, the voltage of the control terminal N1 is increased during the time that the input terminal N3 of the third switching element Qc is charged with the data voltage of the positive polarity. Thus, the current flows from the input terminal N3 of the third switching element Qc to the output terminal N2 such that the voltage of the output terminal N2 increases.

If the gate line 121 is applied with the gate-off voltage, the current flows from the input terminal N3 to the output terminal N2 until the time that the voltage of the output terminal N2 of the third switching element Qc, the voltage of the input terminal N3, and the voltage of the control terminal N1 are equal to each other. As a result, the voltage of the input terminal N3 is decreased and the voltage of the output terminal N2 is increased. Consequently, the voltage of the first sub-pixel electrode 191a connected to the input terminal N3 of the third switching element Qc is also less than the data voltage of the positive polarity that is primarily applied such that the voltage is lower than the voltage of the second sub-pixel electrode 191b, and the voltages on these elements are maintained at this level during the rest of the frame. Also, the voltage of the output terminal N2 of the third switching element Qc is also maintained by the assistance capacitor C3 during the rest of the frame.

As described above, the charged voltages of the first and second liquid crystal capacitors Clca and Clcb are different from each other to improve the side visibility of the liquid crystal display by aligning the molecular axes of the liquid crystal molecules in the four main directions as previously described.

A liquid crystal display different from FIG. 1, FIG. 2, and FIG. 3 is described with reference to FIG. 6 and FIG. 7 where the use of repeated reference numerals designates similar elements in the present embodiment, and most descriptions are not repeated.

Figure 6:
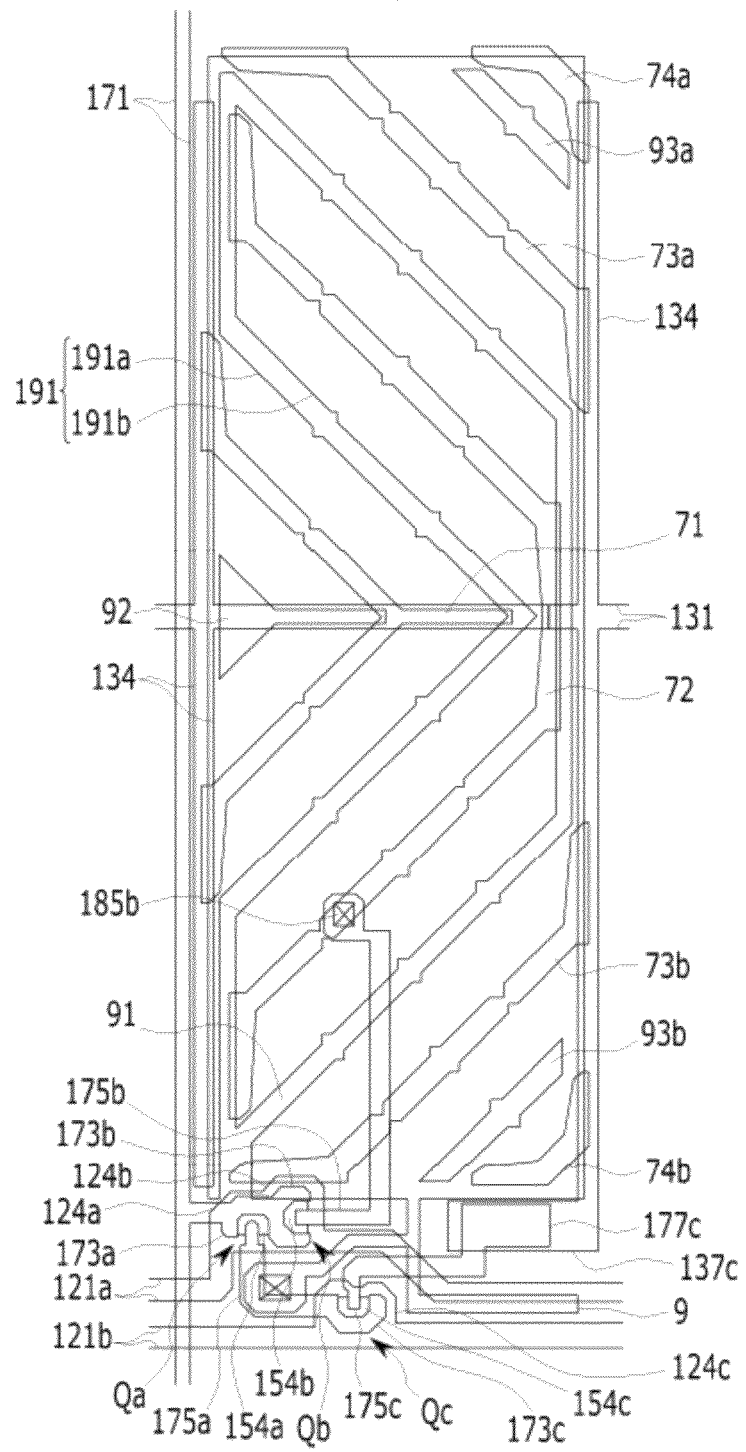
FIG. 6 is a layout view of one pixel of a liquid crystal display according to another exemplary embodiment of the present invention.
Figure 7:
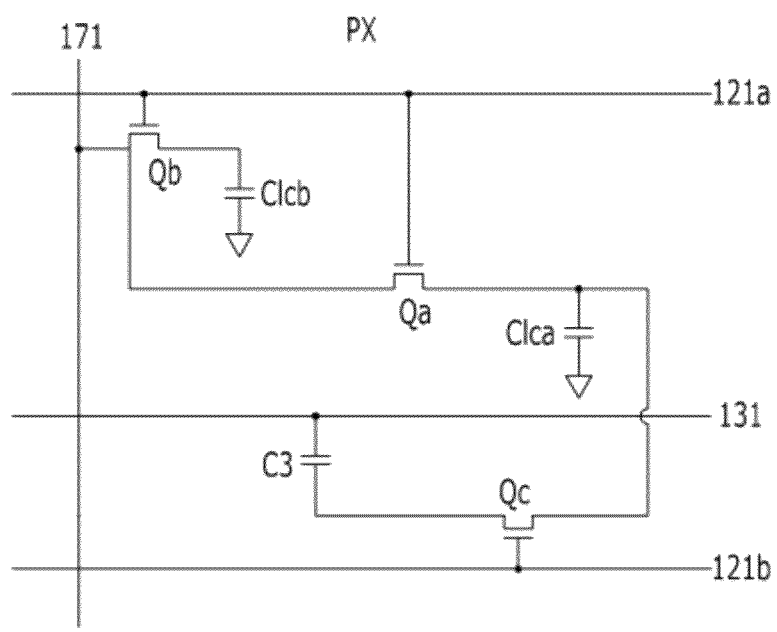
FIG. 7 is an equivalent circuit diagram of one pixel of the liquid crystal display of FIG. 6.

FIG. 6 is a layout view of one pixel of a liquid crystal display according to another exemplary embodiment of the present invention, and FIG. 7 is an equivalent circuit diagram of one pixel of the liquid crystal display of FIG. 6.

An upper panel of a liquid crystal display shown in FIG. 6 includes an upper insulation substrate (not shown) and an opposed electrode formed thereon and including cutouts 71, 72, 73a, 73b, 74a, and 74b.

Also, a lower panel includes a lower insulation substrate (not shown), and a plurality of gate conductors formed thereon and including a plurality of first gate lines 121a, second gate lines 121b, and the common voltage lines 131. Each common voltage line 131 includes a longitudinal portion 134 extending up and down and parallel to the data line 171, and one of the longitudinal portion 134 includes a storage electrode 137 extending to overlap the other layer.

The first gate line 121a includes the first gate electrode 124a and the second gate electrode 124b that are wider than other portions, and the second gate line 121b includes the third gate electrode 124c protruding toward the first gate line 121.

A gate insulating layer (not shown) is formed on the gate conductor, and a plurality of semiconductor stripes (not shown) including a plurality of the first second, and third semiconductors 154a, 154b, and 154c are formed on the gate insulating layer. A pair of ohmic contacts is respectively formed on the first, second, and third semiconductors 154a, 154b, and 154c.

A data conductor including a plurality of data lines 171, a plurality of first drain electrodes 175a, a plurality of second drain electrodes 175b, and a plurality of third drain electrodes 175c is formed on the ohmic contacts. The data line 171 includes the first source electrode 173a and the second source electrode 173b, and the wide end 177c of the third drain electrode 175c overlaps the storage electrode 137, forming the assistance capacitor C3.

The first/second/third gate electrodes 124a/124b/124c, the first/second/third source electrodes 173a/173b/173c, and the first/second/third drain electrodes 175a/175b/175c respectively form the first/second/third thin film transistors Qa/Qb/Qc along with the first/second/third semiconductors 154a/154b/154c.

A passivation layer (not shown) is formed on the data conductor and the exposed first, second, and third semiconductors 154a, 154b, and 154c, and the passivation layer may be made of an organic material and has the first contact hole 185a exposing the wide end of the first drain electrode 175a and the second contact hole 185b exposing the wide end of the second drain electrode 175b.

The pixel electrode including the first sub-pixel electrode 191a and the second sub-pixel electrode 191b is formed on the passivation layer. The overall shape of the first sub-pixel electrode 191a and the second sub-pixel electrode 191b is a quadrangle, and the pixel electrode 191 includes the cutouts 91, 92, 93a, and 93b.

The shielding electrode 9 is connected to the first sub-pixel electrode 191a, and extends in the same direction as the first gate line 121a. The shielding electrode 9 may be positioned between the first gate line 121a and the second gate electrode 121b and is formed to have a length of more than ½ of the length of the transverse edge of the pixel electrode 191. The distance between the shielding electrode 9 and the second gate line 121b may be less than 5 μm.

Referring to FIG. 6, differently from the liquid crystal display of FIG. 1, the third gate electrode 124c as the control electrode of the third switching element Qc is not floated but is instead connected to the second gate line 121b.

The first sub-pixel electrode 191a and the second sub-pixel electrode 191b that are applied with the data voltage are simultaneously applied with the voltage when the first switching element Qa and the second switching element Qb are turned on, and the liquid crystal capacitors Clca and Clcb maintain the applied voltage after turning off the first switching element Qa and the second switching element Qb.

After the first switching element Qa and the second switching element Qb are turned off, the third switching element Qc may be turned on. Differently from the exemplary embodiment of FIG. 1, the third switching element Qc is connected to the second gate line such that it is driven differently from the first switching element Qa and the second switching element Qb. If the third switching element Qc is turned on by the second gate electrode 121b, the voltage of the first liquid crystal capacitor Clca connected to the assistance capacitor C3 is decreased. If the voltage of the first and second liquid crystal capacitors Clca and Clcb is changed, the luminance of the display is also changed, and if the voltage of the first and the second liquid crystal capacitors Clca and Clcb are appropriately adjusted, the lateral visibility may be improved.

Several characteristics and effects of the liquid crystal display according to the above-mentioned exemplary embodiment shown in FIG. 1 and FIG. 2 can be applied to the liquid crystal display according to the present exemplary embodiment.

Figure 8:
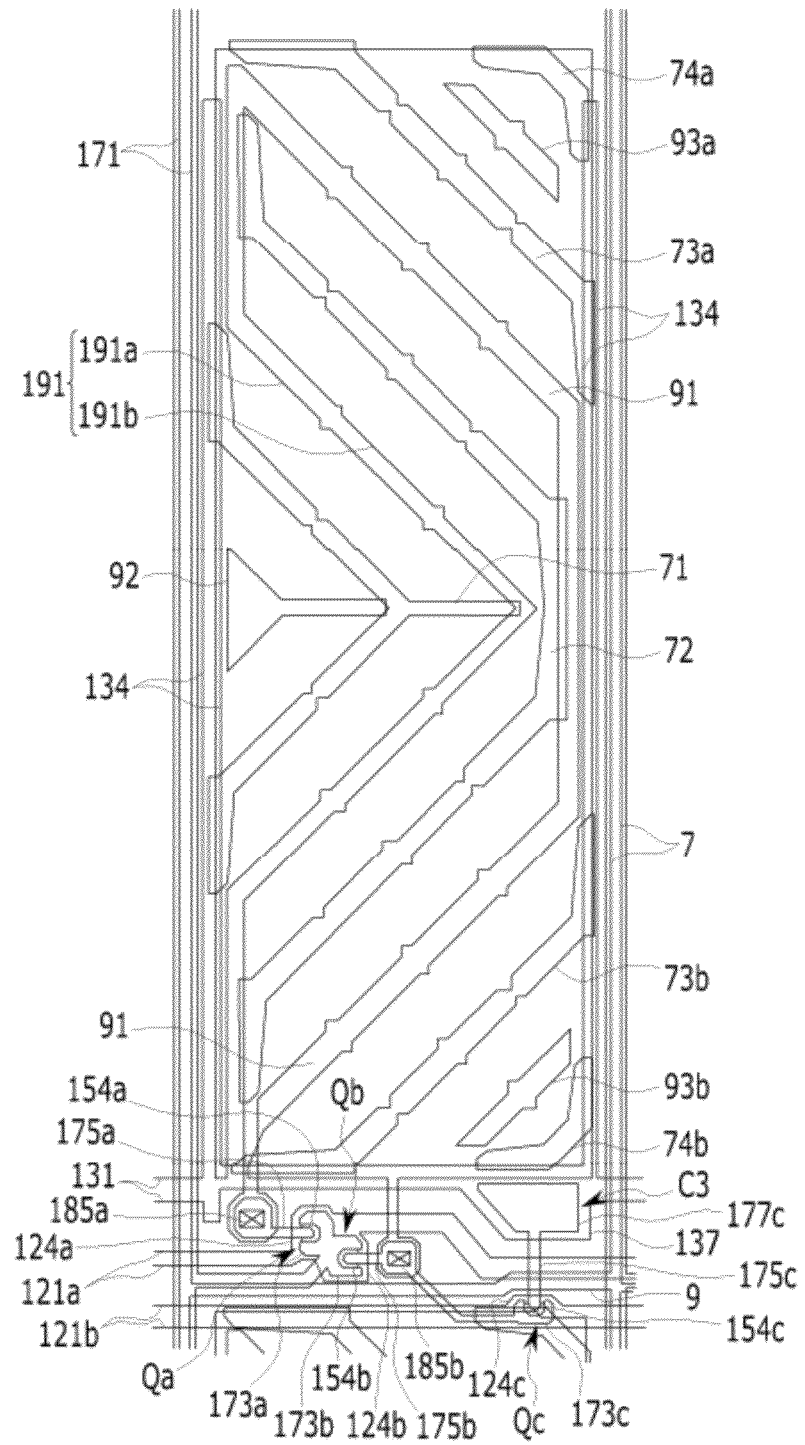
FIG. 8 and FIG. 9 are layout views of a liquid crystal display according to another exemplary embodiment of the present invention.

FIG. 8 is a layout view of a liquid crystal display according to another exemplary embodiment of the present invention.

The liquid crystal display of FIG. 8 relates to the liquid crystal display having the equivalent circuit of FIG. 7 and has almost the same structure as the liquid crystal display shown in FIG. 6. Accordingly, only elements different from those of the liquid crystal display of FIG. 6 are described below.

The liquid crystal display of FIG. 8 includes an upper panel including an opposed electrode having the cutouts 71, 72, 73a, 73b, 74a, and 74b and a lower panel including a pixel electrode 191 having the cutouts 91, 92, 93a, and 93b similar to the liquid crystal display of FIG. 6.

In the lower panel, a plurality of gate conductors including a plurality of first gate lines 121a, second gate lines 121b, and common voltage lines 131 are formed. Common voltage line 131 includes a longitudinal portion 134 and a storage electrode 137. Also, the first gate line 121a includes the first gate electrode 124a and the second gate electrode 124b, and the second gate line 121b includes the third gate electrode 124c protruding from the second gate line 121b toward the first gate line 121a.

A gate insulating layer (not shown) is formed on the gate conductor, and a plurality of semiconductor stripes (not shown) including a plurality of the first, second, and third semiconductors 154a, 154b, and 154c is formed on the gate insulating layer. A pair of ohmic contacts (not shown) is respectively formed on the first, second, and third semiconductors 154a, 154b, and 154c.

A data conductor including a plurality of data lines 171 and a plurality of the first drain electrodes 175a, a plurality of the second drain electrodes 175b, and a plurality of the third drain electrodes 175c is formed on the ohmic contact. The data line 171 includes the first source electrode 173a and the second source electrode 173b, and the wide end 177c of the third drain electrode 175c overlaps the storage electrode 137, thereby forming the assistance capacitor C3. The third source electrode 173c extends from the second drain electrode 175b.

The first/second/third gate electrodes 124a/124b/124c, the first/second/third source electrodes 173a/173b/173c, and the first/second/third drain electrodes 175a/175b/175c respectively form the first/second/third thin film transistors Qa/Qb/Qc along with the first/second/third semiconductors 154a/154b/154c.

A passivation layer (not shown) is formed on the data conductor and the exposed first, second, and third semiconductors 154a, 154b, and 154c, and the passivation layer may be made of an organic material with the first contact hole 185a exposing the wide end of the first drain electrode 175a and the second contact hole 185b exposing the wide end of the second drain electrode 175b.

A pixel electrode including the first sub-pixel electrode 191a and the second sub-pixel electrode 191b is formed on the passivation layer. The overall shape of the first sub-pixel electrode 191a and the second sub-pixel electrode 191b is a quadrangle, and the pixel electrode 191 includes the cutouts 91, 92, 93a, and 93b.

However, the liquid crystal display of FIG. 8 further includes a shielding line 7 overlapping the data line 171, and two neighboring shielding lines 7 are connected to each other by the shielding electrode 9. The shielding lines 7 and the shielding electrode 9 may be formed with the same material as the pixel electrode 191.

The boundary of the shielding line 7 is positioned within the boundary of the data line 171, and the shielding line 7 overlaps the data line 171 and extends according to the data line 171. Also, the shielding line 7 may be applied with the common voltage. For this purpose, it may be connected to the storage electrode line 131 through a contact hole (not shown) of the passivation layer and the gate insulating layer, or may be connected to a short point transmitting the voltage to the common electrode.

As described above, the electric field formed between the data line 171 and the pixel electrode 191 is blocked by disposing the shielding line 7 on the data line 171 such that the parasitic capacitance generated between the data line 171 and the pixel electrode 191 may be minimized and the delay of the data signal transmitted through the data line 171 may be minimized. Accordingly, deterioration of the display quality of the display device by the parasitic capacitance and the deviation thereof may be prevented, and particularly, a stitch defect, which is a type of display defect due to distortions in the electric field that perturb the alignment of the liquid crystal molecules, generated by the deviation of the parasitic capacitance may be minimized.

Several characteristics and effects of the liquid crystal display according to the above-mentioned exemplary embodiment shown in FIG. 6 and FIG. 7 can be applied to the liquid crystal display according to the present exemplary embodiment.

Figure 9:
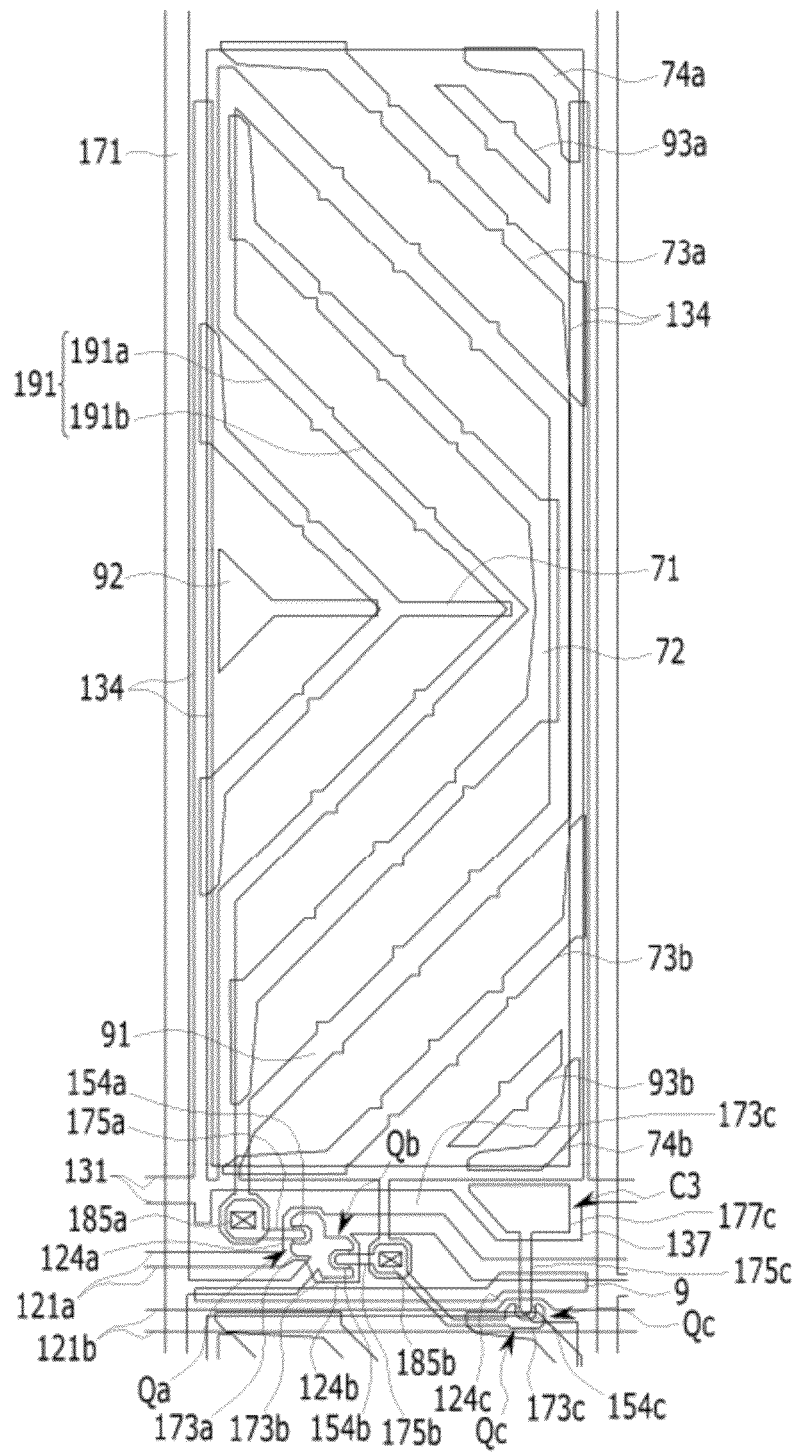

FIG. 9 is a layout view of a liquid crystal display according to another exemplary embodiment of the present invention.

Most of the liquid crystal display of FIG. 9 has the same arrangement and layered structure as the liquid crystal display of FIG. 8.

However, FIG. 9 does not include the shielding line, differently from the liquid crystal display of FIG. 8. Also, the shielding electrode 9 is connected to the second sub-pixel electrode 191b. Here, the second sub-pixel electrode 191b may be applied with the lower voltage than the first sub-pixel electrode 191a. In the exemplary embodiments of FIG. 1, FIG. 2, FIG. 3, FIG. 4, FIG. 5, FIG. 6, FIG. 7, and FIG. 8, the sub-pixel connected to the shielding electrode 9 may be applied with a lower voltage than that of the sub-pixel that is not connected to the shielding electrode.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:
1. A liquid crystal display, comprising:
a first gate line;
a common voltage line separated from the first gate line;
a data line insulated from and crossing the first gate line and the common voltage line;
a first switching element connected to the first gate line and the data line;
a second switching element connected to the first gate line and the data line;
a first liquid crystal capacitor connected to the first switching element;
a second liquid crystal capacitor connected to the second switching element;
a third switching element connected to the first switching element;
a capacitor connected to the third switching element and the common voltage line;
a pixel electrode comprising a first sub-pixel electrode connected to the first switching element and a second sub-pixel electrode connected to the second switching element; and
a shielding electrode disposed in the same layer as the pixel electrode, extending in the same direction as the first gate line, and connected the first sub-pixel electrode,
wherein:
the first sub-pixel electrode is applied with a lower voltage than that of the second sub-pixel electrode;
an input terminal of the third switching element is connected to the drain electrode of the first switching element;
an output terminal of the third switching element is connected to the capacitor; and
a control terminal of the third switching element is electrically floated.
2. The liquid crystal display of claim 1, wherein the first switching element, the second switching element, and the third switching element are positioned between the common voltage line and the first gate line, and the shielding electrode is positioned between the capacitor and the first gate line and is closer to the first gate line than the common voltage line.

3. The liquid crystal display of claim 2, wherein:
a lower transverse edge of the pixel electrode overlaps the common voltage line; and
an upper transverse edge of the pixel electrode overlaps the first gate line.

4. The liquid crystal display of claim 3, wherein the distance from the upper transverse edge of the pixel electrode to the shielding electrode is less than 5 µm.

5. The liquid crystal display of claim 4, wherein the length of the shielding electrode is greater than ½ of the length of the transverse edge of the pixel electrode.

6. The liquid crystal display of claim 5, further comprising a passivation layer disposed between the pixel electrode and the first switching element, the second switching element, and the third switching element,
wherein the passivation layer comprises an organic material,
the shielding electrode is connected to the first switching element through a first contact hole in the passivation layer, and
the second sub-pixel electrode is connected to a drain electrode of the second switching element through a second contact hole in the passivation layer.

7. The liquid crystal display of claim 1, further comprising a second gate line separated from the first gate line,
wherein an input terminal of the third switching element is connected to the drain electrode of the first switching element,
an output terminal of the third switching element is connected to the capacitor, and
a control terminal of the third switching element is connected to the second gate line.

8. The liquid crystal display of claim 7, wherein the electrode is positioned between the first gate line and the second gate line.

9. The liquid crystal display of claim 8, wherein the distance between the second gate line and the electrode is less than 5 µm.

10. The liquid crystal display of claim 9, wherein the length of the electrode is greater than ½ of the length of a transverse edge of the pixel electrode.

11. The liquid crystal display of claim 10, further comprising a passivation layer disposed between the pixel electrode and the first switching element, the second switching element, and the third switching element,
wherein the passivation layer comprises an organic material,
the electrode is connected to the drain electrode of the first switching element through a first contact hole in the passivation layer, and
the second sub-pixel electrode is connected to a drain electrode of the second switching element through a second contact hole in the passivation layer.

12. The liquid crystal display of claim 1, wherein the pixel electrode comprises a plurality of domains divided by partitions.

13. The liquid crystal display of claim 12, wherein the partitions are inclined with respect to the data line, and
an upper portion and a lower portion of the pixel electrode are symmetrical to each other.

14. The liquid crystal display of claim 13, further comprising a liquid crystal layer comprising liquid crystal molecules whose molecular axes are arranged perpendicular to the pixel electrode in the absence of an electric field.

15. The liquid crystal display of claim 1, wherein the shielding electrode comprises the same material as the pixel electrode.

16. A method of manufacturing a liquid crystal display comprising a thin film transistor array panel, the method comprising:
forming a gate line on a substrate;
forming a data line on the substrate crossing and insulated from the gate line;
forming a common voltage line on the substrate and separated from the first gate line;
forming a first switching element connected to the gate line and to the data line;
forming a second switching element connected to the gate line and to the data line;
forming a first liquid crystal capacitor with the first switching element and an opposing electrode with a liquid crystal layer as the dielectric material;
forming a second liquid crystal capacitor with the second switching element and the opposing electrode with the liquid crystal layer as the dielectric material;
forming a third switching element connected to the first switching element;
forming a capacitor with the third switching element and the common voltage line;
forming a pixel electrode comprising a first sub-pixel electrode connected to the first switching element and a second sub-pixel electrode connected to the second switching element; and
forming a shielding electrode disposed in the same layer as the pixel electrode, extending in the same direction as the first gate line, and connected to the first sub-pixel electrode,
wherein:
the first sub-pixel electrode is applied with a lower voltage than that of the second sub-pixel electrode;
an input terminal of the third switching element is connected to the drain electrode of the first switching element;
an output terminal of the third switching element is connected to the capacitor; and
a control terminal of the third switching element is electrically floated.

* * * * *